Feb. 10, 1942.  J. N. GLADDEN  2,272,699
AIRPLANE LANDING GEAR
Filed Dec. 9, 1939
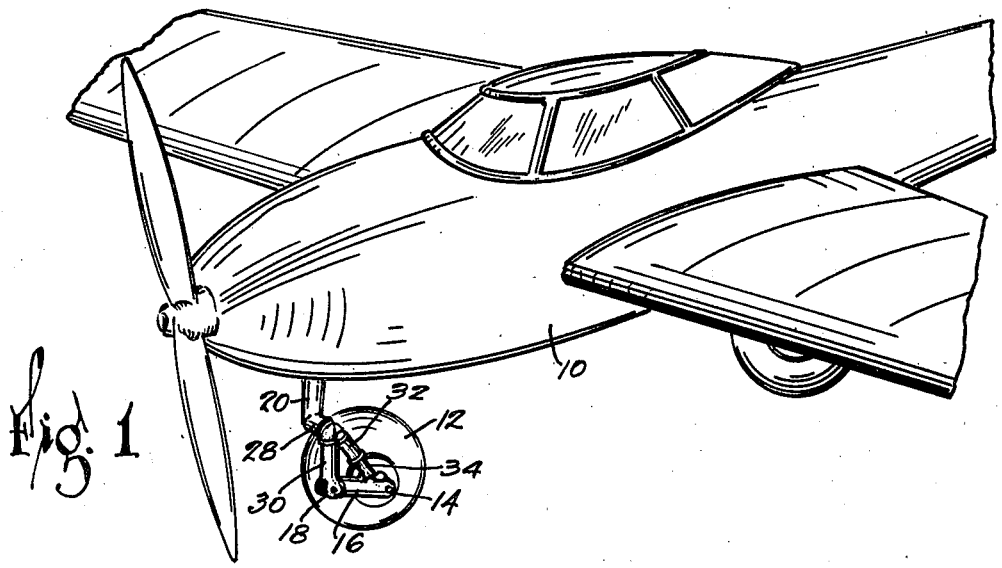
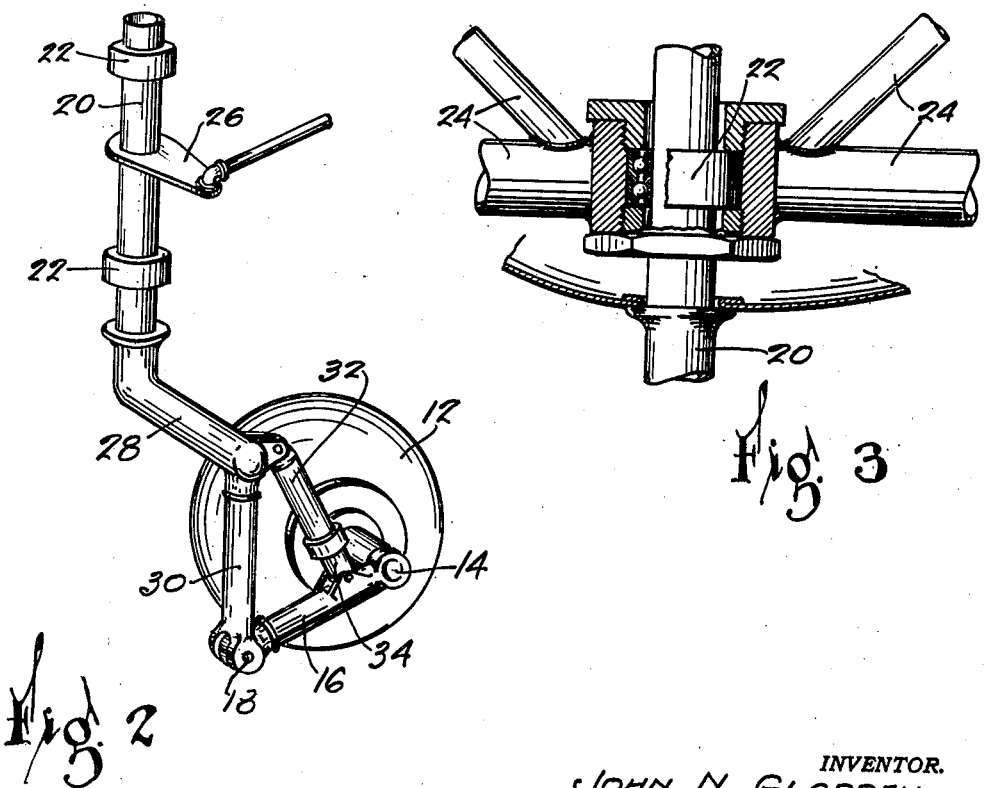
INVENTOR.
JOHN N. GLADDEN
BY
M. W. Conkey
ATTORNEY.

Patented Feb. 10, 1942

2,272,699

UNITED STATES PATENT OFFICE 2,272,699

AIRPLANE LANDING GEAR

John N. Gladden, Burbank, Calif., assignor to Bendix Aviation Corporation, South Bend, Ind., a corporation of Delaware Application December 9, 1939, Serial No. 308,344

4 Claims. (Cl. 244—104)

This invention relates to airplane landing gears, and particularly to the mounting of a wheel forming part of the landing gear and which swivels as the plane taxies along on the ground. Preferably the invention is embodied in the mounting of a nose wheel which is swiveled to steer the plane when on the ground.

An object of the invention is to provide a simple and rugged mounting for such a wheel, which facilitates the swiveling of the wheel, and which includes a shock absorber which acts both as a part of the wheel mounting and to absorb part of the shock of landing.

The above and other objects, and various features of novelty, of the invention will be apparent from the following description of one illustrative embodiment shown in the accompanying drawing, in which:

Figure 1 is a perspective view of part of the airplane, showing the arrangement of the nose wheel and its mounting;

Figure 2 is a perspective view of the wheel and mounting, dismounted from the plane; and Figure 3 is a detail sectional view of one means for swiveling the wheel mounting to the structure of the plane.

The drawing illustrates an airplane 10, having landing gear which includes a nose wheel 12. The wheel 12 is journaled on a spindle 14 carried by the rear end of a horizontal arm 16 mounted on a pivot 18 at its forward end.

A vertical post 20 is swiveled in suitable bearings 22 carried by the structure 24 of the plane, and is adapted to be swiveled in steering by force applied to an arm 26 or the equivalent. The post 20 is preferably ahead, and in the vertical central plane, of the wheel 12. Its lower end is offset laterally as a rigid arm 28, to which is rigidly secured a downwardly projecting extension 30 carrying the pivot 18 at its lower end.

The upper end of the extension 30 is pivotally connected to one member 32 of a telescoping hydraulic shock absorber, the other member 34 of which is pivotally connected to the horizontal arm 16 near its rear end.

In operation, on landing the plane the shock absorber 32—34 absorbs part of the force of landing. On the ground, the wheel 12 (being behind the post 20) tends to act as a caster wheel. However, force applied through arm 26 can swivel the post 20 to turn the plane of the wheel to steer the plane.

While one illustrative embodiment has been described in detail, it is not my intention to limit the scope of the invention to that particular embodiment or otherwise than by the terms of the appended claims.

I claim:

1. An airplane having a landing gear comprising, for one end of the airplane, a wheel, a vertical post angularly movable about its axis and mounted in the plane of the wheel ahead of the wheel and provided with an extension rigidly connected to its lower end and arranged at one side of the wheel plane, a horizontal arm pivoted at its forward end to the lower end of the extension and provided at its rear end with means upon which said wheel is rotatably journaled, and an inclined shock absorber connected at its lower end to said arm adjacent its rear end, the upper end of the shock absorber being connected to the upper portion of said extension.

2. An airplane having a landing gear comprising, for the front end of the airplane, a wheel, a vertical post, steering means for angularly moving said post about its axis, said post being mounted in the plane of the wheel ahead of the wheel and being provided with an extension rigidly connected to its lower end and arranged at one side of the wheel plane, a horizontal arm pivoted at its forward end to the lower end of the extension and provided at its rear end with means upon which said wheel is rotatably journaled, and an inclined shock absorber connected at its lower end to said arm adjacent its rear end, the upper end of the shock absorber being connected to the upper portion of said extension.

3. For one end of an airplane, a landing gear comprising a wheel, a vertical post angularly movable about its axis and mounted in the plane of the wheel ahead of the wheel and provided with an extension rigidly connected to its lower end and arranged at one side of the wheel plane, a substantially horizontal arm pivoted at its forward end to the lower end of the extension and provided at its rear end with means upon which said wheel is rotatably journaled, and an inclined shock absorber connected at its lower end to said arm adjacent its rear end, the upper end of the shock absorber being connected to the upper portion of said extension.

4. For one end of an airplane, a landing gear comprising, a wheel, a vertical post, steering means for angularly moving said post about its axis, said post being mounted in the plane of the wheel ahead of the wheel and being provided with an extension rigidly connected to its lower end and arranged at one side of the wheel plane, a substantially horizontal arm pivoted at its forward end to the lower end of the extension and provided at its rear end with means upon which said wheel is rotatably journaled, and an inclined shock absorber connected at its lower end to said arm adjacent its rear end, the upper end of the shock absorber being connected to the upper portion of said extension.

JOHN N. GLADDEN.